United States Patent [19]

Broadt et al.

[11] 4,371,913
[45] Feb. 1, 1983

[54] REFLECTOR LAMP MODULE FOR PHOTOFLASH ARRAY

[75] Inventors: David R. Broadt, Lewisburg, Pa.; Emery G. Audesse, Beverly, Mass.

[73] Assignee: GTE Products Corporation, Stamford, Conn.

[21] Appl. No.: 217,721

[22] Filed: Dec. 18, 1980

[51] Int. Cl.³ .............................................. G03B 15/02
[52] U.S. Cl. ...................................... 362/17; 362/11; 362/16
[58] Field of Search ...................... 362/11, 13, 14, 15, 362/16, 17

[56] References Cited

U.S. PATENT DOCUMENTS 3,774,020 11/1973 Heeman ................................ 362/13
3,860,809 1/1975 Shoupp ................................. 362/11

Primary Examiner—Donald P. Walsh
Attorney, Agent, or Firm—Thomas H. Buffton

[57] ABSTRACT

A multilamp photoflash unit has a housing formed to provide a multiplicity of cavities, each having a reflective surface and formed to receive a flashlamp. Each of the cavities has a reflective surface width opening to flashlamp diameter ratio of less than about 1.2, and the cavity configuration includes a planar rear wall section and a pair of bi-planar sidewall sections.

15 Claims, 4 Drawing Figures

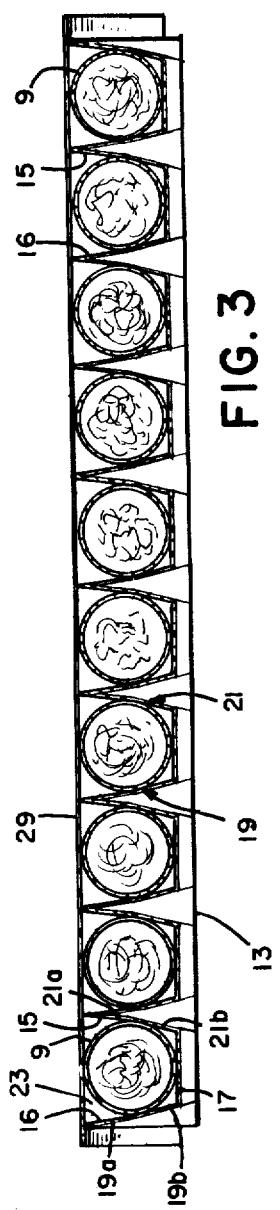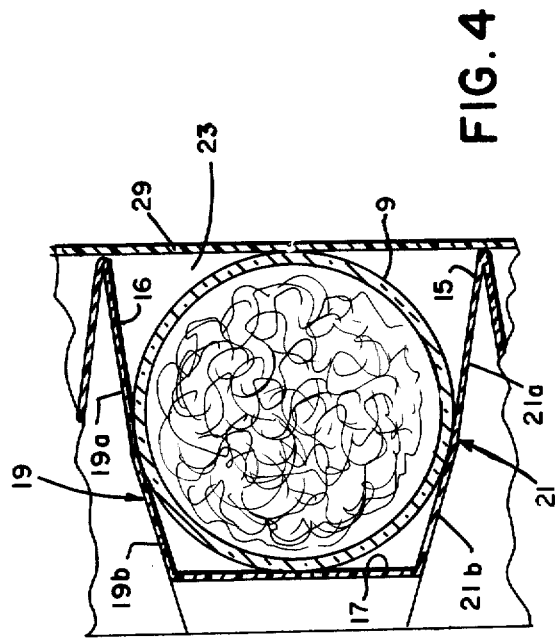

REFLECTOR LAMP MODULE FOR PHOTOFLASH ARRAY

TECHNICAL FIELD

This invention relates to photoflash units and, more particularly to compact reflector-lamp modules and multilamp photoflash arrays having a multiplicity of such reflector-lamp modules in close-nested relationship.

BACKGROUND ART

Generally, multilamp photoflash units may be characterized as either cube or linear array configurations. Cube unit configurations are illustrated by U.S. Pat. No. 3,730,669, referred to as magicube. A linear array configuration is depicted in U.S. Pat. No. 3,857,667, referred to as a flashbar, and planar array configurations are shown in U.S. Pat. Nos. 3,894,226 and 4,017,728, referred to as a flip flash.

Significantly, all of the above-mentioned multilamp photoflash units employ self-contained reflectors of a substantially parabolic design. An example is shown in U.S. Pat. No. 3,609,332. As is well known, a point source located at the focal point of a parabolic reflector has a high forward reflecting capability and provides a light beam which is substantially parallel and of a width equal to the reflector opening. However, a flashlamp is not a point source but rather a relatively large light source. As a result, the light is not reflected as a parallel light beam but rather is dispensed in a manner such that the light intensity is greater at a center region of a photographic zone than at the zones surrounding the center zone. Thus, the center zone of a photographic area tends to exhibit overexposure characteristics while the surrounding zones tend to be normal or underexposed.

As known in the art, the method of measuring light distribution across the photographic zone is by comparing the light output in the center 5° to the average output of a 5° zone between 15° and 20° inside the perimeter of the picture area. To our knowledge, prior art lamp reflector modules have provided a distribution between 1.6:1 and 2:1. This means that the center has nearly twice the exposure of the edge; this is nearly a full f-stop setting on the camera lens.

Ideally, a distribution ratio of 1:1 is desired; however, even a bare (unreflected) lamp will provide a distribution of about 1.3:1 because of the cosine law of light distribution. Elimination of a focusing reflector, of course, results in a significant loss of light output. Hence, in practice, a lamp-reflector system providing a 1.3:1 ratio of light distribution would be a significant improvement in light uniformity while retaining a degree of output enhancement.

A further consideration in the improvement of photoflash unit design is the provision of a compact reflector-lamp module to facilitate closer lamp spacing for a reduced package volume. U.S. Pat. No. 3,860,809 describes a lamp-reflector combination wherein the ratio of the width of the reflector opening-to-lamp envelope diameter is from about 1.2 to 2. Further the reflector is described as having an arcuate rear wall portion that is in nested relationship with the lamp envelope and has substantially flat outwardly diverging sidewall segments. U.S. Pat. No. 3,991,308 shows a reflector having a cylindrical central portion and flat side portions. U.S. Pat. No. 3,267,272 shows a reflector with a substantially V-shaped cross-section.

We have found that the arcuate, cylindrical and V-shaped rear portions of the reflector cavities are comparatively disadvantageous with respect to light output in very reduced (compact) ratios of reflector opening-to-lamp diameter. More specifically, a planar rear segment has been found to provide a gain in zonal lumen output. U.S. Pat. No. 3,508,040 shows a reflector with a planar back portion and a pair of single planar side portions.

The simplest and least costly method of producing reflectors is by thermo-vacuum-forming of thin, thermoplastic film. With reduced ratios of reflector opening-to-lamp diameter, however, excessive thinning of the rear portion of the reflector results. The aforementioned planar rear section design with single flat sides exagerates the problem even further; for example, we have observed plastic thinning at the corners of the cavity walls whereby the minimum thickness is less than 10% of the maximum thickness. The smaller the reflector opening-to-lamp diameter or, conversely, the larger the lamp diameter-to-reflector opening, the greater the plastic thinning.

OBJECTS AND SUMMARY OF THE INVENTION

An object of the present invention is to provide improved reflector-lamp modules for photoflash lamp devices, such as multilamps photoflash arrays. Another object of the invention is to provide an improved multilamp photoflash unit having a more compact reflector opening-to-lamp diameter ratio with improved structural integrity and light output. Still another object of the invention is to provide a multilamp photoflash unit which is economical to fabricate and provides enhanced packaging capabilities.

These and other objects, advantages and capabilities are achieved in one aspect of the invention by a photoflash device comprising a reflector and flashlamp combination wherein the flashlamp has a tubular envelope; the reflector has surfaces forming a lamp receiving cavity and defining a front opening; and the lamp is nested within the reflector cavity with the longitudinal axis of the lamp parallel to the longitudinal axis of the reflector cavity, with the width of the reflector opening-to-diameter of the lamp envelope being less than about 1.2. According to a further aspect of the invention, the reflector cavity comprises a planar rear wall section joined to a pair of oppositely disposed bi-planar side wall sections. One effect of this cavity configuration and narrow reflector opening with respect to lamp diameter is to enhance light distribution while providing acceptable light output. The improved distribution is due to the use of a non-focusing reflector arrangement, and the light loss expected to result therefrom is compensated for by the larger lamp (with respect to reflector size) and the planar rear wall section.

In a preferred embodiment, the lamp and reflector combination is employed in a multilamp photoflash unit including a housing means having a back portion containing a plurality of lamp-receiving reflective cavities. A plurality of flashlamps each having a tubular envelope are longitudinally disposed in respective ones of the reflective cavities, as mentioned above, and the ratio of the width of each cavity opening to the diameter of the lamp contained therein is less than about 1.2. A light-transmitting front portion of the housing means is attached to the back portion and covers the cavity openings to enclose the lamps. Each cavity preferably comprises a planar rear wall section and a pair of bi-planar sidewall sections. When disposed in a unidirectional planar array, particularly a horizontal linear array, the peripheries of adjacent cavity openings are substantially contiguous, and a compact, close-nested package results. Typically the housing back portion is a formed sheet of plastic film with the cavities formed therein. With the defined planar rear wall and bi-planar sidewalls, plastic thinning of each cavity wall is reduced, whereby the minimum thickness is greater than one-quarter the maximum thickness, thereby maintaining structural integrity. Further, in the compact package, the front portion of the housing means is substantially planar and contiguous with the front surfaces of the plurality of lamp envelope.

BRIEF DESCRIPTION OF THE DRAWINGS

FIG. 3 is a planar sectional view of FIG. 1 taken along the lines 3—3; and

FIG. 4 is an enlarged view of a single reflective surface and flashlamp of FIG. 3.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
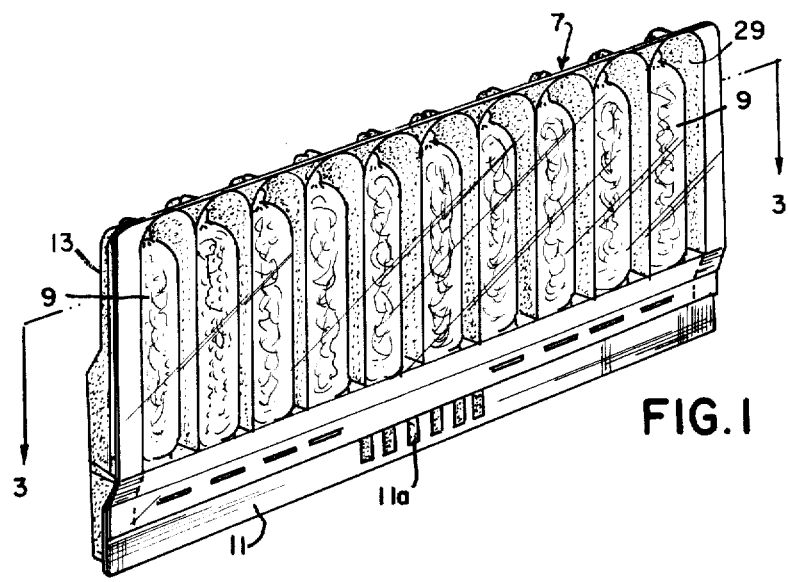
FIG. 1 is a perspective view of a preferred embodiment of a multilamp photoflash unit embodying the invention.
Figure 2:
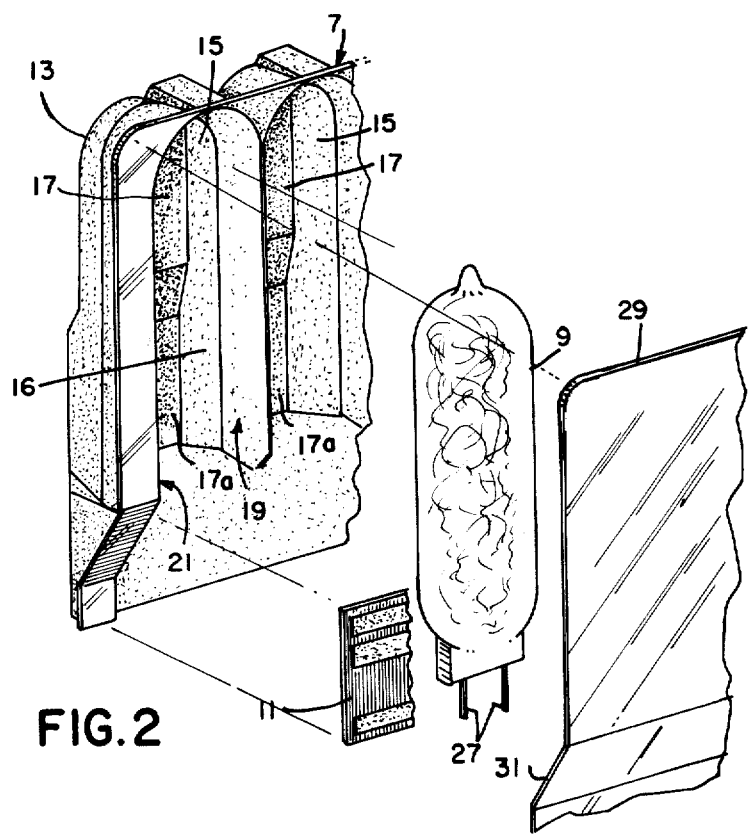
FIG. 2 is an exploded view of the embodiment of FIG. 1.

Referring to the drawings, FIGS. 1 and 2 illustrate a multilamp photoflash unit which includes a housing member 7, a multiplicity of flashlamps 9 disposed within the housing member 7 and a printed circuit board 11 positioned to extend into the housing member 7. The printed circuit board 11 includes terminals 11a electrically coupled to the flashlamps 9 and provides for external access of electrical energy to the flashlamps 9 within the housing member 7.

In more detail, the housing member 7 has a back portion 13 formed to provide a plurality of cavities 15 disposed in a planar array facing in one direction, in this embodiment. Each of the cavities 15 is or has affixed thereto a reflective surface 16 which includes a planar rear wall section 17 and a pair of oppositely-disposed bi-planar side wall sections 19 and 21. The bi-planar side sections 19 and 21 are affixed to and extend outwardly from the planar rear section 17 to form a reflective surface opening 23.

Positionally located to contact, or join, the back portion 13 of the housing member 7 is the printed circuit board 11. This printed circuit board 11 extends inwardly of at least a portion of the multiplicity of cavities 15 and provides electrical access thereto from an energy source external to the housing member 7.

Also, each flashlamp 9 has a tubular envelope disposed within each of the cavities 15 contiguous to the reflective surface 16, and the longitudinal axis of each lamp envelope is disposed parallel to the longitudinal axis of the reflector cavity. Each of the flashlamps 9 includes a pair of lead wires 27 which are formed for connection to the printed circuit board 11 and serve to provide a path for energization of the flashlamp 9 by way of the printed circuit board 11.

Further, the housing member 7 includes a light-transmitting front portion 29 which is attached to the back section 13. This substantially planar front portion 29 covers openings 23 and encloses the flashlamps 9 within the cavities 15. Moreover, the front portion 29 has a rearwardly directed web 31 which encloses and protects the connections of the lead wires 27 of the flashlamps 9 to the printed circuit board 11.

Referring again to the housing member 7, a cross-sectional view of a multilamp photoflash unit having a horizontal linear array of aligned cavities 15 each containing a flashlamp 9 is illustrated in FIG. 3. A single reflector or lamp module is shown in FIG. 4. Although not evident from the diagrammatic illustration of FIG. 3, each of the cavities 15 has a reflective surface 16 contiguous to the flashlamps 9 and is formed to provide a reflective surface opening 23.

Also, the reflective surface 16 of the cavities 15 includes a planar rear wall section 17. In the particular embodiment of FIG. 2, it is to be noted that the above-mentioned planar rear wall section 17 has a recessed lower portion 17a for accommodation of projections (not shown) from the printed circuit board 11.

Joined to and extending outwardly from the planar rear wall section 17 of each of the cavities 15 is a pair of oppositely disposed bi-planar side wall sections 19 and 21. Each of these bi-planar sidewall sections 19 and 21 includes a pair of juxtaposed longitudinal planar segments 19a and 19b and 21a and 21b which may be but not necessarily need be of the same size. The segments 19a and 19b are joined to form an obtuse angle between the surfaces thereof within the cavity, and the segments 21a and 21b are joined in like manner. Each lamp is then nested in a respective reflector, as best shown in FIG. 4, with the tubular lamp envelope having portions contiguous with the rear wall section 17 and all of the sidewall planar segments 19a, 19b, 21a and 21b. Further, the aperture plane of each reflector cavity, represented by the position of the front housing portion 29, is substantially contiguous with the front surface of each lamp envelope 9, as shown in FIGS. 7 and 4.

The bi-planar sidewall sections 19 and 21 extend outwardly from the planar rear wall section 17 to form the reflective surface opening 23. Moreover, this reflective surface opening 23 for each of the cavities 15 has a width dimension such that the ratio thereof to the diameter of a flashlamp 9 is less than about 1.2.

It has been found that the simplest and least costly method of producing the above-mentioned housing member back portion 13 having a plurality of cavities 15 is a thermovacuumforming technique utilizing a thin, thermoplastic film. Also, it has been found that thermovacuum-forming to provide a planar rear wall section 17 and a reflector opening-to-depth ratio of less than about 1.2 tends to cause excessive thinning of the sidewall corners forming the rear wall section 17.

However, this undesired excessive thinning of the rear portion of the reflector cavity is greatly reduced by providing the bi-planar oppositely disposed side sections 19 and 21. More specifically, the minimum wall thickness of each reflector cavity is greater than one-quarter the maximum thickness. Moreover, the bi-planar side sections 19 and 21 greatly enhance the "nesting" or packaging capabilities whereby closely spaced aligned cavities 15 are achieved.

In a specific implementation, such as illustrated in the drawings, the reflector cavities were thermovacuum-formed in a sheet of polyvinyl chloride with a maximum wall thickness of 15 mils. The height of each reflector cavity was about 1⅛ inch. The width of each reflector opening was about 0.370 inch, and the outside diameter of each lamp envelope (lacquer coated glass) was about 0.320 to 0.330 inch. Hence, the ratio of reflector width opening-to-lamp diameter was about 1.16 to 1.12. The typical maximum and minimum wall thicknesses for each cavity were about 14 mils and 4 mils, respectively. Upon flashing each lamp in the reflector array, the light distribution was about 1.3:1 and the total light output was about 330 zonal lumen-seconds.

While there has been shown and described what is at present considered the preferred embodiments of the invention, it will be obvious to those skilled in the art that various changes and modifications may be made therein without departing from the scope of the invention as defined by the appended claims.

INDUSTRIAL APPLICABILITY

A multilamp-photoflash unit has been provided which includes a plurality of cavities aligned in a single plane with each cavity including a reflective surface having a width of reflective surface opening to flashlamp diameter ratio of less than about 1.2. The unit not only provides an enhanced uniformity and increased intensity of light on a photographic exposure area, due to the minimized ratio of reflector opening to lamp diameter together with a planar rear wall section, but the unit also provides greatly improved packaging capability in reduced space, while retaining structural integrity, due to the bi-planar sidewall configuration.

I claim:

1. In a multilamp photoflash unit, the combination comprising:
   a reflector having a plurality of lamp-receiving cavities each having a planar rear wall section joined to a pair of oppositely disposed biplanar sidewall sections defining a front reflector opening width; and
   a flashlamp having a tubular envelope disposed within each of said cavities with said envelope contiguous to said planar rear wall section and said oppositely disposed biplanar wall sections and said reflector opening width with respect to the lamp diameter being in a ratio of less than about 1.2 to 1.

2. A multilamp photoflash unit comprising:
   housing means having a back portion with a plurality of lamp-receiving cavities and a light-transmitting front portion formed for enclosure of said cavities, said cavities having an interior reflective surface including a planar rear wall section joined to a pair of oppositely disposed biplanar side wall sections forming a cavity opening of a given width;
   flashlamp having a tubular envelope and nested within each one of said lamp-receiving cavities, said cavity and said flashlamp each having a longitudinal axis in parallel relationship and said flashlamp contiguous to said planar rear wall section and said pair of biplanar side wall section and said given cavity opening with respect to said diameter of said flashlamp being in the ratio of less than about 1.2 to 1.

3. The device of claim 1 wherein each of said bi-planar sidewall sections consists of a pair of juxtaposed longitudinal planar segments.

4. The device of claim 3 wherein each of said planar segments of a sidewall section is substantially equal in size.

5. The device of claim 1 wherein each of said bi-planar sidewall sections consists of a pair of longitudinal planar segments joined to form an obtuse angle between the surfaces thereof within said cavity.

6. The device of claim 5 wherein portions of said lamp envelope are contiguous with said planar rear wall section and all planar segments of said sidewall sections of the reflector cavity.

7. The device of claim 1 wherein the minimum wall thickness of said reflector cavity is greater than one-quarter the maximum thickness.

8. The device of claim 7 wherein said reflector comprises a vacuum-formed material with a maximum wall thickness of about 15 mils.

9. The device of claim 1 wherein the aperture plane of said reflector is substantially contiguous with the front surface of said lamp envelope.

10. The photoflash unit of claim 2 wherein said reflective cavities are disposed in a planar array facing in one direction.

11. The photoflash unit of claim 10 wherein said reflective cavities are disposed in a horizontal linear array with the peripheries of adjacent cavity openings being substantially contiguous.

12. The photoflash unit of claim 11 wherein each of the bi-planar sidewall sections of each cavity consists of a pair of longitudinal planar segments joined to form an obtuse angle between the reflective surfaces thereof within the cavity, and portions of the lamp enclosed in each cavity are contiguous with the planar rear wall section and all planar segments of the sidewall sections of the respective lamp cavity.

13. The photoflash unit of claim 12 wherein each of said planar segments of a cavity sidewall section is substantially equal in size.

14. The photoflash unit of claim 2 wherein the back portion of said housing means comprises a formed sheet of plastic film with said lamp receiving cavities formed therein, and the minimum wall thickness of each cavity is greater than one-quarter the maximum thickness.

15. The photoflash unit of claim 10 wherein said front portion of the housing means covering said cavity openings is substantially planar and substantially contiguous with the front surfaces of said plurality of lamp envelopes.

* * * * *